(12) United States Patent
Schmidt et al.

(10) Patent No.: US 8,374,893 B2
(45) Date of Patent: Feb. 12, 2013

(54) SYSTEM AND METHOD HAVING A HIERARCHICAL MODEL WITH OVERRIDE CAPABILITY FOR GENERATING A FLEXIBLE INSURANCE PLAN

(75) Inventors: Mike Schmidt, Oakville (CA); Darren Willson-Rymer, Thornhill (CA); Scott J. Sievert, Erieau (CA); Jane Goguen, Oakville (CA); Ron Reynolds, Toronto (CA)

(73) Assignee: Emergis Inc, Calgary, Alberta (CA)

( * ) Notice: Subject to any disclaimer, the term of this patent is extended or adjusted under 35 U.S.C. 154(b) by 349 days.

(21) Appl. No.: 11/896,281

(22) Filed: Aug. 30, 2007
(Under 37 CFR 1.47)

(65) Prior Publication Data

US 2009/0157433 A1    Jun. 18, 2009

Related U.S. Application Data

(63) Continuation of application No. 11/611,786, filed on Dec. 15, 2006, now abandoned, which is a continuation of application No. 11/069,448, filed on Feb. 28, 2005, now abandoned, and a continuation of application No. 10/857,580, filed on May 28, 2004, now abandoned.

(51) Int. Cl.
*G06Q 10/00* (2012.01)
(52) U.S. Cl. .......................................................... 705/4
(58) Field of Classification Search ................... 705/2–4
See application file for complete search history.

(56) References Cited

U.S. PATENT DOCUMENTS

| | | | |
|---|---|---|---|
| 4,831,526 A | | 5/1989 | Luchs et al. |
| 5,523,942 A | * | 6/1996 | Tyler et al. .......................... 705/4 |
| 5,752,236 A | * | 5/1998 | Sexton et al. ...................... 705/4 |
| 7,673,282 B2 | * | 3/2010 | Amaru et al. ................... 717/104 |
| 2003/0069760 A1 | * | 4/2003 | Gelber ............................... 705/4 |
| 2004/0230530 A1 | * | 11/2004 | Searl et al. ....................... 705/51 |

FOREIGN PATENT DOCUMENTS

| | | |
|---|---|---|
| CA | 2 180 653 | 7/1995 |
| CA | 2180653 | 7/1995 |
| CA | 2 221 962 | 11/1996 |
| CA | 2221962 | 11/1996 |
| CA | 2 237 373 | 11/1999 |
| CA | 2237373 | 11/1999 |

OTHER PUBLICATIONS

PCT International Search Report and Written Opinion; PCT/CA2005/000847, Aug. 23, 2005, 10 pages.
PCT International Search Report and Written Opinion; PCTCA2005/00847, Aug. 23, 2005, 10 pages.
International Preliminary Report of Patentability issued by the International Bureau of WIPO dated Dec. 7, 2006 for International Patent Application No. PCT/CA2005/000847.

* cited by examiner

*Primary Examiner* — John Pauls
(74) *Attorney, Agent, or Firm* — Grant Tisdall; Gowling Lafleur Henderson LLP

(57) ABSTRACT

A system and method for implementing an insurance plan to coordinate an adjudication of a submitted claim corresponding to the plan. The plan includes a people model and a benefit model, such as hierarchical trees combined by a plurality of policies. The system and method comprise assigning a first predefined inheritance of global attributes to coupled elements of the people tree and assigning a second predefined inheritance of global attributes to coupled elements of the benefits tree. The system and method also assigning a local administration rule for at least one local attribute of the trees, the assignment between a selected people element of the people tree and a selected benefit element of the benefits tree. The local administration rule overrides the corresponding global attributes of the selected elements, such that resolution of the global attributes with the local attributes for the selected elements provides a rule set for adjudication of the submitted claim.

37 Claims, 12 Drawing Sheets

SYSTEM AND METHOD HAVING A HIERARCHICAL MODEL WITH OVERRIDE CAPABILITY FOR GENERATING A FLEXIBLE INSURANCE PLAN (This application claims the benefit of U.S. Continuation application Ser. No. 11/611,786 Filed Dec. 15, 2006 now abandoned, which claims benefit to U.S. Continuation application Ser. No. 11/069,448 Filed Feb. 28, 2005 now abandoned and U.S. patent application Ser. No. 10/857,580 Filed May 28, 2004 now abandoned, in its entirety herein incorporated by reference.)

FIELD OF THE INVENTION

The present invention relates to claim adjudication of insurance plans.

BACKGROUND OF THE INVENTION

The adjudication of a claim is one of the primary functions of an adjudication engine, which is done according to a predefined insurance plan. At the heart of the adjudication process is the execution of business rules to determine the eligibility of a claim and its parts (with respect to the plan), and if the parts are eligible, what amount should be paid. However, there currently exists insurance plan schemes that do not allow for flexibility and individuality of insurance plan design and maintenance. For example, two people with the same general set of plan attributes but with a few slightly different maximums and frequencies would have to have individual plans constructed for each of them, involving separate people and benefit models with associated rules. This process of designing two separate plans is undesirable, as there would be a fair amount of duplication in the resultant individual benefit and people models and associated rules. There is a further disadvantage with current insurance plan models for defining conflict resolution, since the execution order of complicated sets of rules is typically rigid in assignment.

It is an object of the present invention to provide a system and method for defining a flexible insurance plan for the purpose of adjudication to obviate or otherwise mitigate at least some of the above presented disadvantages.

SUMMARY OF THE INVENTION

Typically two people with the same general set of plan attributes but with a few slightly different maximums and frequencies would have to have individual plans constructed for each of them, involving separate people and benefit models with associated rules. This process of designing two separate plans is undesirable, as there would be a fair amount of duplication in the resultant individual benefit and people models and associated rules. There is a further disadvantage with current insurance plan models for defining conflict resolution, since the execution order of complicated sets of rules is typically rigid in assignment. On the contrary, the present invention provides a system and method for implementing an insurance plan to coordinate an adjudication of a submitted claim corresponding to the plan. The plan includes a people model and a benefit model, such as hierarchical trees combined by a plurality of policies. The system and method comprise assigning a first predefined inheritance of global attributes to coupled elements of the people tree and assigning a second predefined inheritance of global attributes to coupled elements of the benefits tree. The system and method also assigning a local administration rule for at least one local attribute of the trees, the assignment between a selected people element of the people tree and a selected benefit element of the benefits tree. The local administration rule overrides the corresponding global attributes of the selected elements, such that resolution of the global attributes with the local attributes for the selected elements provides a rule set for adjudication of the submitted claim.

According to the present invention there is provided a method for implementing an insurance plan to coordinate an adjudication of a submitted claim corresponding to the plan, the plan including a people model and a benefit model combined by a plurality of policies, the method comprising the steps of: assigning a first predefined inheritance of global attributes to coupled elements of the people model; assigning a second predefined inheritance of global attributes to coupled elements of the benefits model; and assigning a local rule for at least one local attribute, the assignment between a selected people element of the people model and a selected benefit element of the benefits model, the local rule for overriding the corresponding global attributes of the selected elements; wherein resolution of the global attributes with the local attributes for the selected elements provides a rule set for adjudication of the submitted claim.

According to a further aspect of the present invention there is provided a system for implementing an insurance plan to coordinate an adjudication of a submitted claim corresponding to the plan, the plan including a people model and a benefit model combined by a plurality of policies, the system comprising: the people model having a first predefined inheritance of global attributes to coupled elements of the model; the benefits model having a second predefined inheritance of global attributes to coupled elements of the model; and a local rule for assigning to at least one local attribute, the assignment between a selected people element of the people model and a selected benefit element of the benefits model, the local rule for overriding the corresponding global attributes of the selected elements; wherein resolution of the global attributes with the local attributes for the selected elements provides a rule set for adjudication of the submitted claim.

According to a still further aspect the present invention there is provided a computer program product for implementing an insurance plan to coordinate an adjudication of a submitted claim corresponding to the plan, the plan including a people model and a benefit model combined by a plurality of policies, the computer program product comprising: a computer readable medium; a people model module stored on the medium having a first predefined inheritance of global attributes to coupled elements of the people model; a benefits model module stored on the medium having a second predefined inheritance of global attributes to coupled elements of the benefits model; and a local rule module stored on the medium for assigning to at least one local attribute, the assignment between a selected people element of the people model and a selected benefit element of the benefits model, the local rule for overriding the corresponding global attributes of the selected elements; wherein resolution of the global attributes with the local attributes for the selected elements provides a rule set for adjudication of the submitted claim.

BRIEF DESCRIPTION OF THE DRAWINGS

A better understanding of these and other embodiments of the present invention can be obtained with reference to the following drawings and detailed description of the preferred embodiments, in which.

It is noted that similar references are used in different figures to denote similar components.

DETAILED DESCRIPTION OF THE PREFERRED EMBODIMENT

Figure 1:
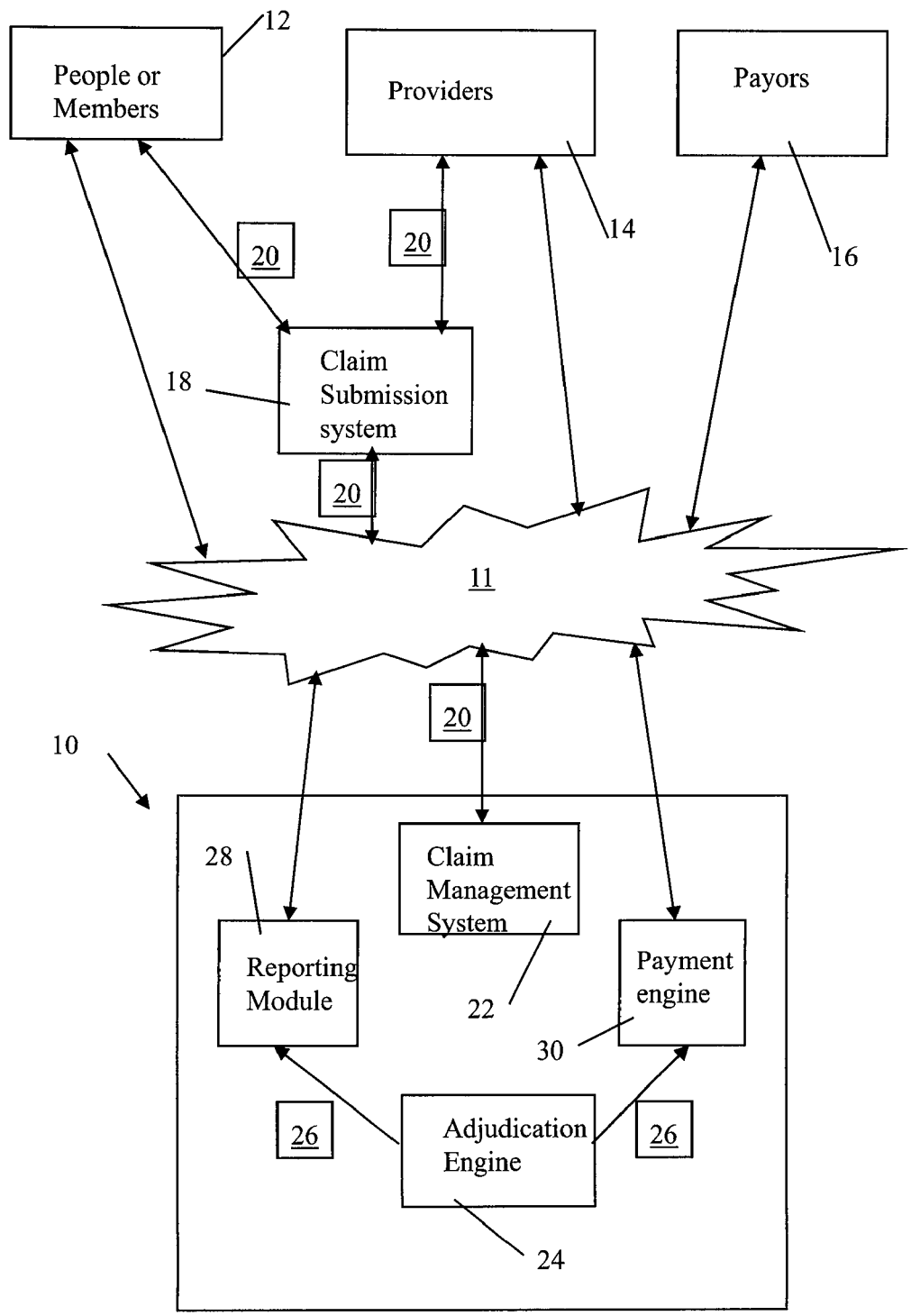
FIG. 1 is an overview of a claims processing environment.
Figure 4:
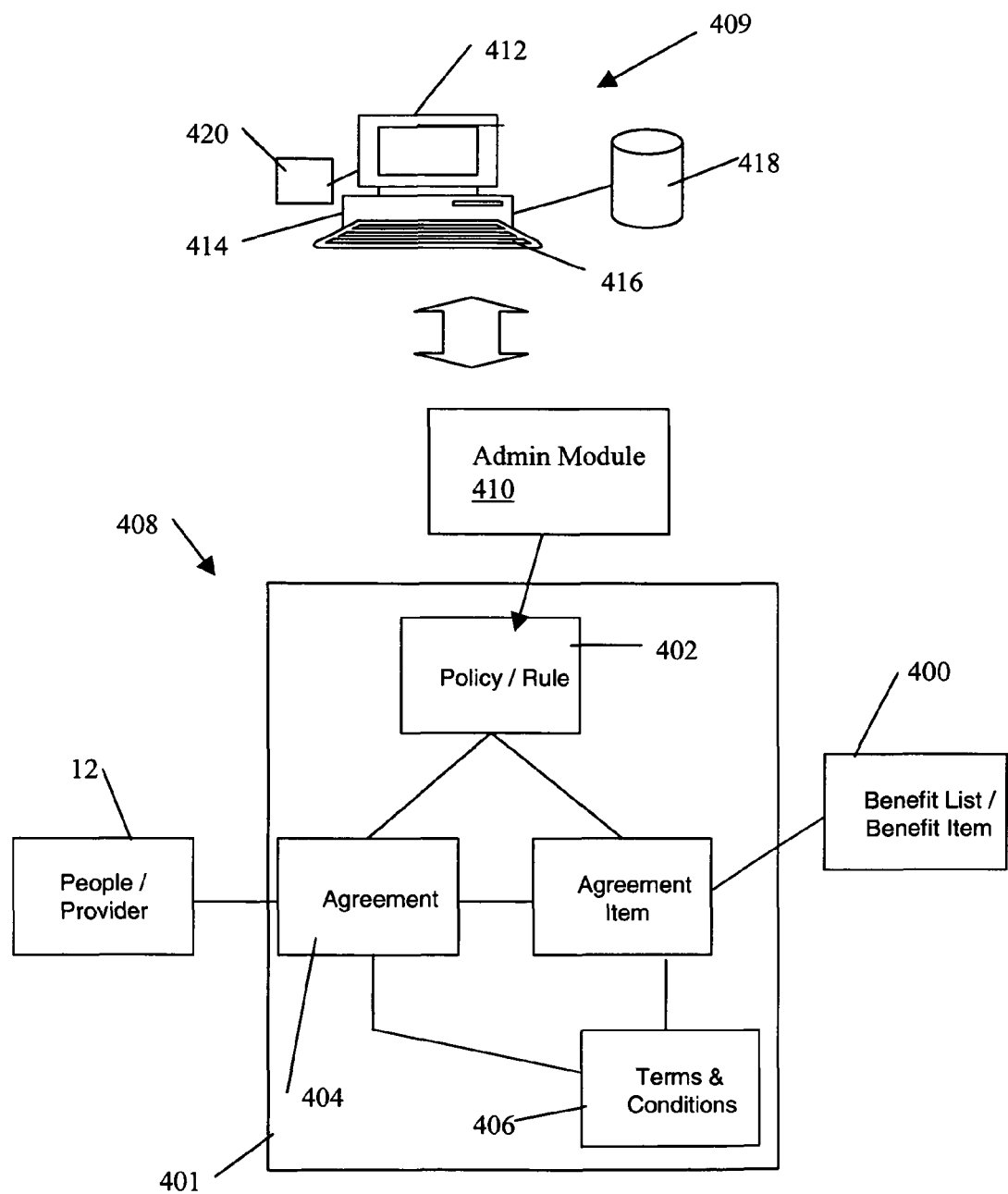
FIG. 4 is a functional view of a plan corresponding to the claims of FIG. 1.

Referring to FIG. 1, a claims processing system 10 interacts over a network 11; with people 1; receiving insurance applicable products and services, with providers 14 (e.g. dentists, optometrists, physicians, physiotherapists, etc. . . . ) that are providing the products and services to the people 12, and with payors 16 (e.g. insurance companies) that are responsible for paying for the services and products according to an insurance plan 408 (see FIG. 4). The network 11 can be such as but not limited to the Internet and/or a private network. The providers 14 and the people 12 can use a claim submission system 18 to submit claims 20 to the processing system 10 for adjudication. The claims submission system 18 is a generalized actor that can represent all systems that are able to submit claims 20 to the processing system 10. For example, the claim submission system 18 can include such as but not limiter to a provider EDI System (not shown), a payor claims submission & management system (not shown), and a member web claims submission system (not shown).

Referring again to FIG. 1, the processing system 10 has a claims management module 22 for receiving the claims 20 and processing them in a suitable form for subsequent adjudication by an adjudication engine 24. Once adjudicated, the adjudication engine 24 directs a decision 26 of the adjudicated claim (including such as but not limited to payment details, entitlement details, claims history, and other explanation of benefits EOB) to a reporting module 28 and to a payment engine 30. The payment engine coordinates details of payment for the adjudicated claim 20 to the payor 16, for subsequent settlement of accounts with the people 12 and providers 14. The reporting module 28 can provide detailed reports on explanation of benefits, claim history and payment to the payor 16, provide 14, and people 12, as desired.

Figure 2:
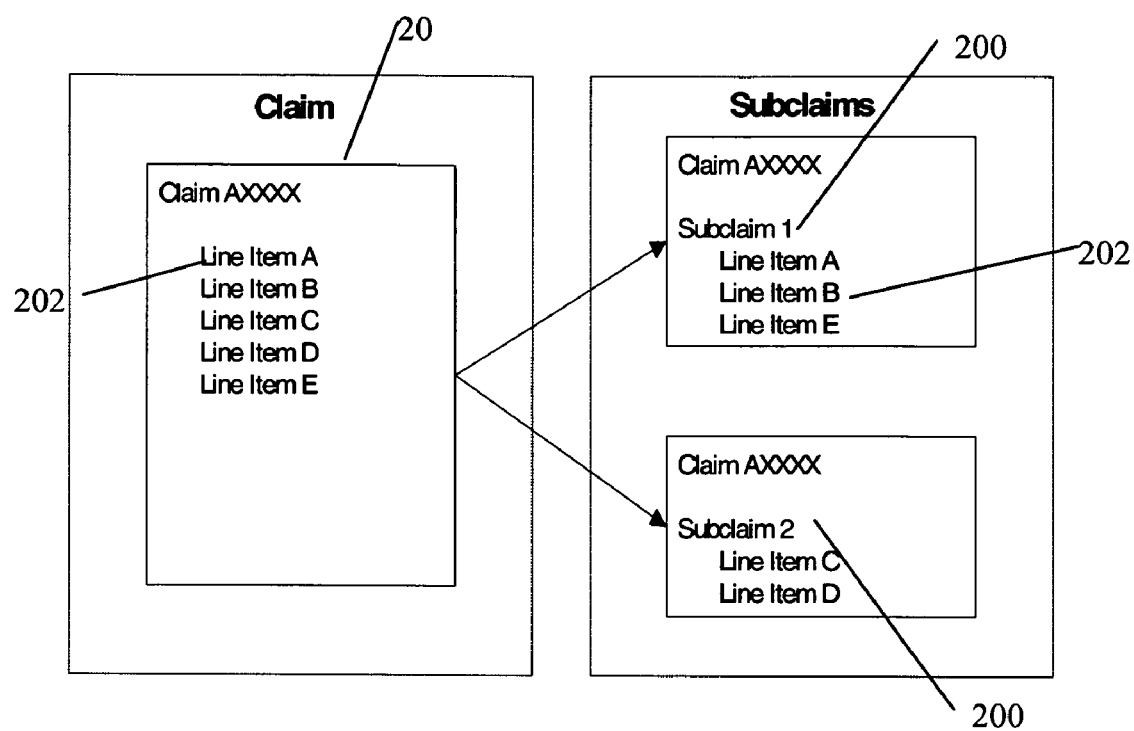
FIG. 2 is an example configuration of a claim of FIG. 1.

Referring to FIG. 2, there can be multiple claim 20 types that define the types of transaction entering the Adjudication Engine 24 through the management system 22 (see FIG. 1). The possible claim 20 types are such as but not limited to new claim, void claim, adjust claim, new estimate, void estimate, and adjust estimate. The claim 20 may contain multiple line items 202 of multiple benefit types (e.g. dental, health, vision, drug, etc. . . . ) for multiple patients 12 from multiple providers 14 (with one payor 16 for one member such as a company with multiple insured people 12 or an individual person 12—see FIG. 1). The Claim Management System 22 assigns a unique identifier to each claim 20, such as a Claim ID. A subclaim 200 represents the collection of all line items 202 from the claim 20 for the same benefit type. The Claim Management System 22 assigns a unique identifier to each subclaim 200, such as a Subclaim ID. Each of the Line Items 202 represent each element from the claim 20 related to one patient 12, one service/product, and one provider 14. The Claim Management System 22 assigns a unique identifier to each line item 202, such as a Line Item ID. It is recognized that other claim 20 configurations than described above can be used in the processing system 10 (see FIG. 1), if desired.

Figure 3:
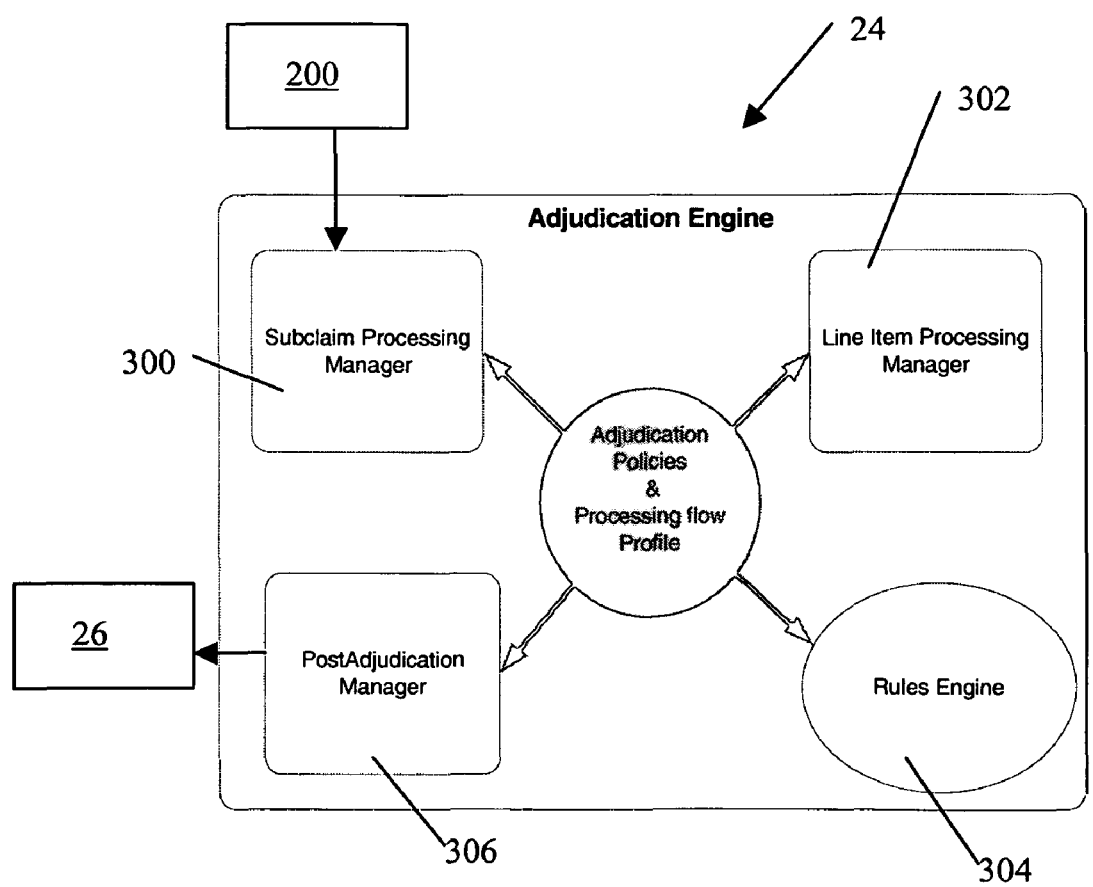
FIG. 3 represents functional structure of an adjudication engine of the environment of FIG. 1.

Referring to FIGS. 2 and 3, the Adjudication Engine 24 is responsible for executing policies for subclaim 200 processing (and the processing of the subclaim's line items 202). The engine 24 executes subclaim and line item policies 402 (see FIG. 4) in order to determine the payable amount for a set of the line items 202. The results of the adjudication process are passed as the decision 26 back to the Claim Management System 22 so that claim level rules may be applied (i.e. reassemble the individual subclaims 200 back into their original claim 20). The Adjudication Engine 24 is responsible for executing rules at the subclaim 200 and line item 202 level in order to determine the eligibility of the subclaim 200 or line item 202, and to determine the payable amount if the subclaim 200 or line item 202 is eligible. The Adjudication Engine 24 can be responsible for processing the following types of transactions:

New Claims;
Claim Adjustments;
Void Claims;
New Estimates;
Estimate Adjustments; and
Void Adjustments.

Referring again to FIG. 3, the Adjudication Engine can have 4 major components that are responsible for processing the subclaims 200 (see FIG. 2) on different steps of the adjudication process. A Subclaim Processing Manager 300 is responsible for accepting subclaims 200 from the claim management system 22. It is also responsible for decomposing subclaims 200 into line items 202 and executing all required Policies 402 to prepare subclaims 200 for adjudication. A Line Item Processing Manager 302 is responsible for preparing the line items 202 for adjudication that can include such as but not limited to: loading Line Item Policies, converting procedure code; and applying overrides to resolve conflicts (further described below). A Rules Engine 304 is responsible for processing all Policies 402 associated with the line items 202. A Post Adjudication Manager 306 is responsible for processing adjudication results and creating a result set represented by the decision 26 (see FIG. 1). It is recognized that all four components of Adjudication Engine 24 participate in Adjudication Engine processing flow and can be configurable by a processing flow profile module 308 and different types of Policies. In general, the basic flow managed by the module 308 can include such as but not limited to: identify the claimed service/product, date of service, payor, group, membership, patient and provider from the line item 202 context; obtain all policies and agreements that are associated to the entities identified in the line item 202 context; read and assemble the policies and agreements obtained; resolve conflicting policies 402 and agreements 404 (see FIG. 4) through overrides; and place the resolved agreement 404 and policies 402 into the line item 202 and/or subclaim 200 context.

Referring to FIG. 4, the plan 408 (in context of which the claim 20 and subclaims 200 can be applied) is an assembly of people 12 and potential products/benefits 400 for insurance purposes. The people 12 and the products/benefits 400 are each represented as hierarchical trees (see FIGS. 7 and 9) that are interconnected by a series of plan or administration rules 401. The plan rules 401 includes plan attributes such as policies/rules 402 and associated terms and conditions 406, further described below, which are incorporated by the agreement 404. The agreement 404 can represent the link between people/provider 12, benefit lists 400, policies 402, and their terms & conditions 406 (parameters and effective period).

Referring again to FIG. 4, the plan 408 can be generated by a plan setup and maintenance system 409 having a user interface 416 interacting with the module 410. The interface 416 is coupled to a processor 414, to interact with a user (not shown) to construct the plan 408. The user interface 416 can include one or more user input devices such as but not limited to a QWERTY keyboard, a keypad, a trackwheel, a stylus, a mouse, a microphone and the user output device such as an LCD screen display 412 and/or a speaker. If the screen 412 is touch sensitive, then the display 412 can also be used as the user input device as controlled by the processor 414. The user interface 416 is employed by the user to coordinate creation and maintenance of the plan 408 with the associated models 700, 800, 900 (see FIGS. 7, 8, 9) and administration rules 401.

Further, it is recognized that the user interface 414 can include a computer readable storage medium 420 coupled to the processor 416 for providing instructions to the processor 416 and/or to load/update features of the plan 408 contained in the memory 418, for ultimate deployment on the claim processing system 10 (see FIG. 1) to assist the adjudication engine 24 in adjudication of claims 20 associated with the plan 408. The computer readable medium 420 can include hardware and/or software such as, by way of example only, magnetic disks, magnetic tape, optically readable medium such as CD/DVD ROMS, and memory cards. In each case, the computer readable medium 420 may take the form of a small disk, floppy diskette, cassette, hard disk drive, solid state memory card, or RAM provided in the memory 418. It should be noted that the above listed example computer readable mediums 420 can be used either alone or in combination.

Figure 5:
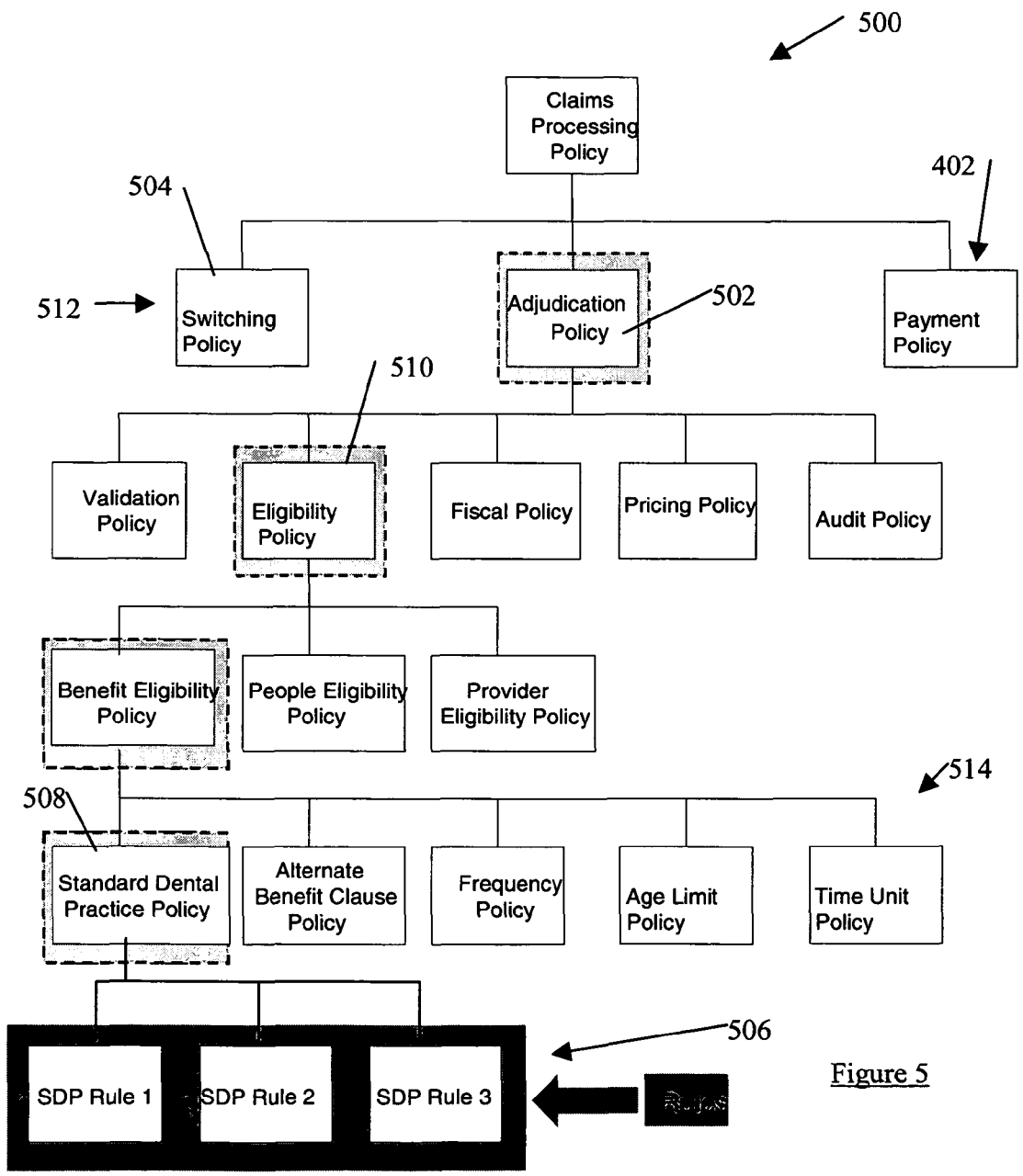
FIG. 5 is a structured policy model of the plan of FIG. 4.

Referring to FIG. 5, an example of the number of policies 402 that can be included in the plan 408 (FIG. 4) is shown. It should be noted that each policy 402 contains a series of rules 506 for implementing the corresponding policy 402 under the auspices of the plan 408 (see FIG. 4). The individual policies 402 are organized in a policy model or tree 500 that provides for global priority of their execution order (of their respective contained rules 506) during processing of the claims 20 and corresponding subclaims 200. For example, location of the policies 402 in the policy tree 500 dictates their order of execution, such as from the top level 512 to the bottom level 514, and from left to right in each level. For example, under the global priority an Adjudication Policy 502 would execute after a Switching Policy 504, and a Standard Dental Practice Policy 508 would execute after an Eligibility Policy 510. It is noted that SDP represents standard dental procedure.

However, a further feature of the plan 408 (see FIG. 4) is that local priorities can be set for each of the policies 402 in the tree 500 irrespective of the policy 402 location. This setting of individual policy 402 priority overrides the overall execution order represented by global priority of the tree 500. This setting of local policy priority for individual policies 402 of the tree 500 could be performed for example by a plan administrator module 410 (see FIG. 4) during initial set-up and maintenance of the plan 408. It is recognized that not every policy 402 of the model 500 automatically has a local priority setting. For example, the global inheritance scheme of the model 500 can assign priorities to policies 402 except in the case of conflicts, as further described below, in which local priority settings for affected policies 402 are used by the administrator during setup and/or maintenance of the plan 408 (see FIG. 4). It is recognized that conflicts can occur for complicated plan 408 designs and in cases where override plan rules 401 are used (see FIG. 10).

Figure 6:
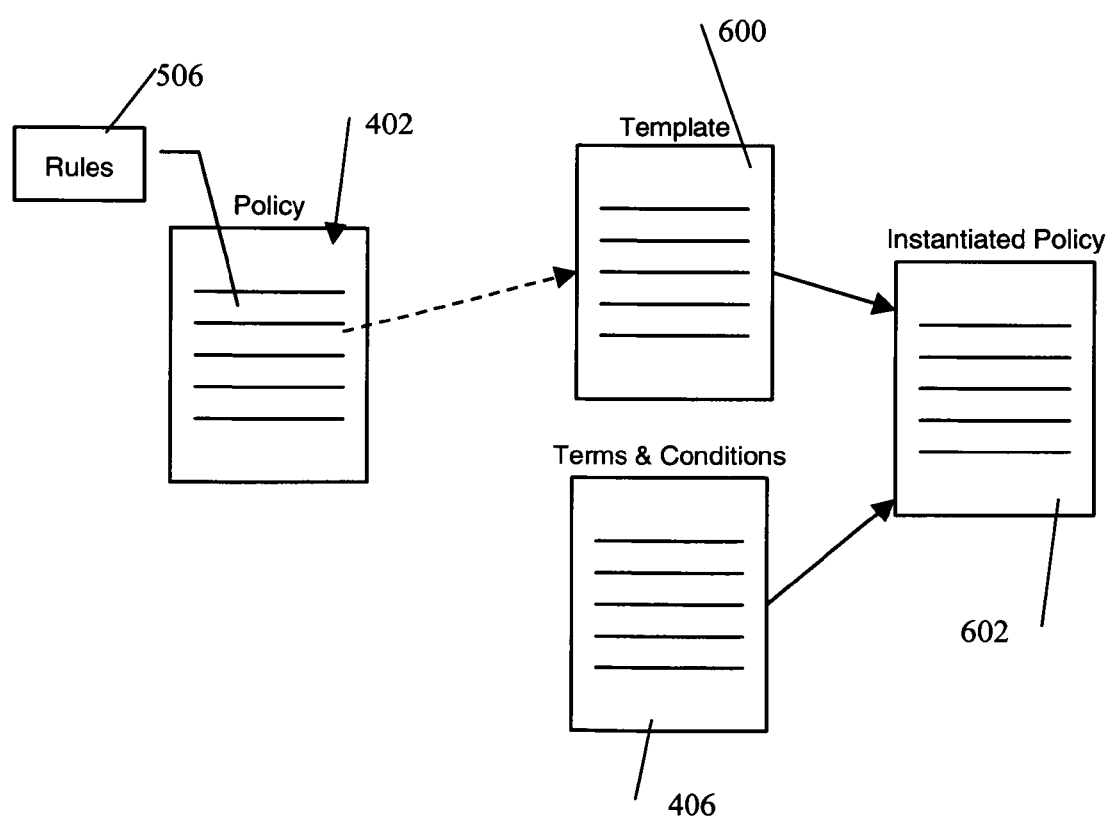
FIG. 6 is an example construction of an instantiated policy of the plan of FIG. 4.

Referring to FIG. 6, each of the rules 506 represents a unit of logic that the adjudication engine 24 executes during processing of the claim 20 (see FIG. 1). A rule specialist (not shown) can create the logic of the policy 402 by writing one or more corresponding rules 506 to define the policy 402. The attributes associated with the elements of the models 700, 800, 900 (see FIGS. 7 and 9) include the parameters that are required in the rules 506, which are identified, and a template 600 containing the business logic and the required parameters is created for the group administrator (using the administrator module 410) to populate. A range for each parameter can also be defined. The group administrator populates the template 600 with their desired parameters, which include the Terms & Conditions 406. The populated template 600 represents an instantiated policy 602.

For example, the Rules Specialist can writes a maximum policy 402 including maximum rules 506:
If the (max type)'s accumulated maximum amount on (benefit_value) for the claimed (max period) is greater than (max value), then (max action) the line item.
If the (max_type)'s accumulated maximum on (benefit_value) for the claimed (max_period) plus the total eligible amount of the claim is greater than (max_value), then total eligible amount equals (max value) minus accumulated maximum amount.
If the (max type)'s accumulated maximum on (benefit_value) for the claimed (max_period) plus the total eligible amount of the claim is equal to or less than (max_value) then total eligible amount equals total eligible amount.

The Rules Specialist then creates a maximum template 600 from the policy 402 logic. The Group Administrator then fills in the template 600 with their desired parameters 406 to populate the maximum template 600 representing the instantiated maximum policy 602:
If the (patient)'s accumulated maximum on (orthodontics) for the claimed (one calendar year) is greater than ($2000), then (deny) the line item.
If the (patient)'s accumulated maximum on (orthodontics) for the claimed (one calendar year) plus the total eligible amount of the claim is greater than ($2000), then total eligible amount equals ($2000) minus accumulated maximum.
If the (patient)'s accumulated maximum on (orthodontics) for the claimed (one calendar year) plus the total eligible amount of the claim is equal to or less than ($2000) then total eligible amount equals total eligible amount.

Referring to FIG. 4, the agreement 404 can represent a contract between the group (set of people 12) and the payor 16 (see FIG. 1) for insurance coverage. The agreement 404 outlines the policies 402 applicable to the agreement 404 such as the Adjudication Policy 502 (see FIG. 5). The agreement 404 also identifies agreement items belonging to the agreement 404, such as but not limited to claim types of health and dental. The agreement item may specify a benefit list (eg. Dental Benefit List 1) and any policies 402 that apply to the agreement item, such as fiscal, eligibility, or pricing policies 402. For example, it is recognized that the fiscal policy 402 can contain fiscal rules 506 such as but not limited to eligibility of people/services/products, maximums, deductibles, copay, and service/product limits. The benefit policy 402 can contain benefit rules 506 such as but not limited to rules described by the health disciple (e.g. dental can't fill a tooth that was previously pulled). The pricing policy 402 can contain pricing rules 506 such as but not limited to geography, time, provider, and payment arrangements. The terms & conditions 406 associated with the agreement 404 or the agreement items specify the parameters to these policies 406. Examples of the terms and conditions 406 include such as but not limited to what is covered, annual dollar maximum, and prices according to current health care fee guides. It is recognized that the agreement 404 and associated policies 402 and conditions 406 represent the plan rules 401.

Figure 7:
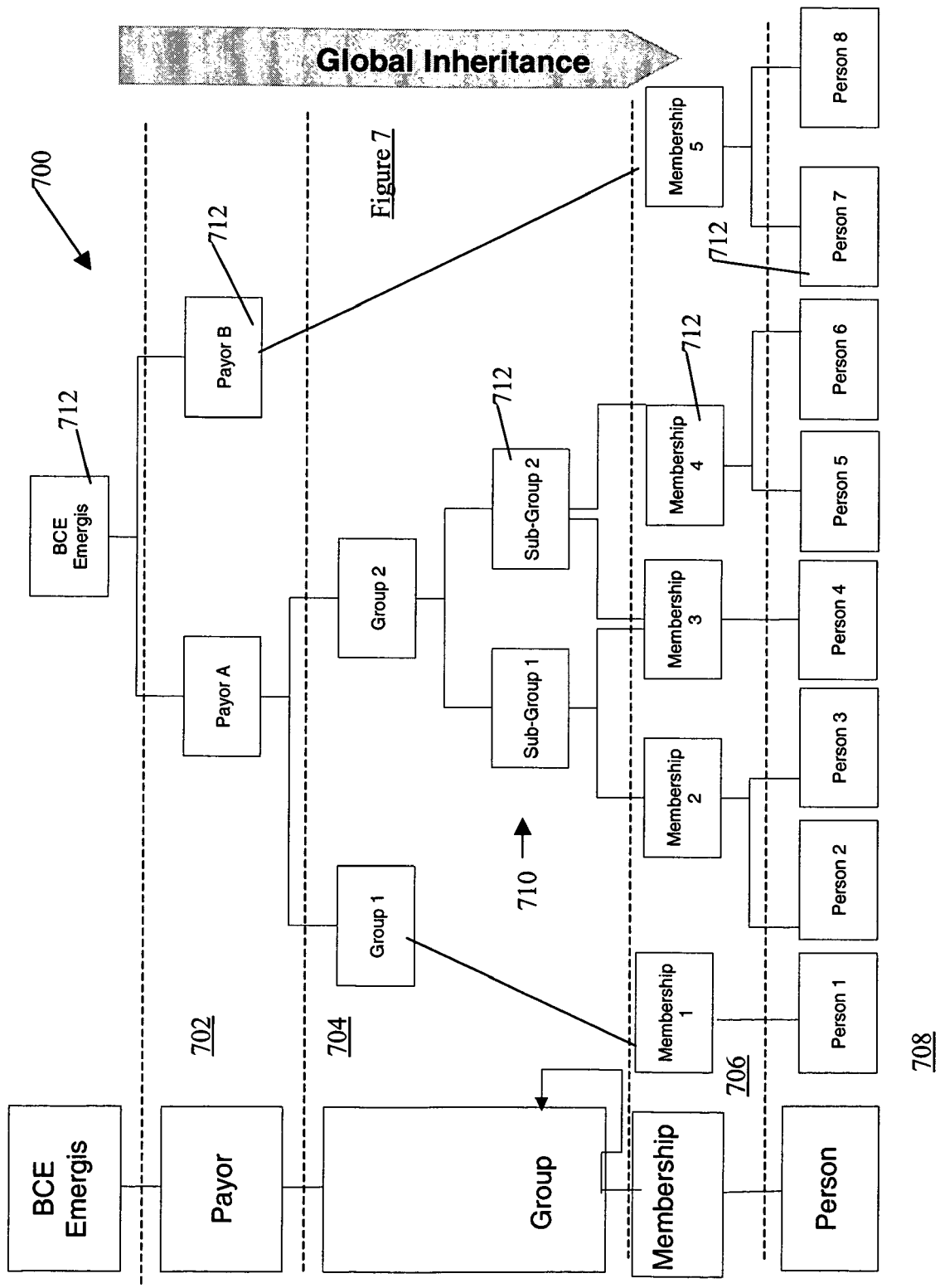
FIG. 7 is an example of a structured people model of FIG. 1.

Referring to FIG. 7, the people 12 of FIG. 1 are represented as the structured people model 700, such as a hierarchical tree. The model 700 has an implicit inheritance, such that attributes associated with elements 712 of higher levels are automatically associated with the elements 712 of the lower levels, on a global basis. The model 700 can have such as but not limited to a payor level 702, a group level 704, a membership level 706, and a person/individual level 708. It is recognized that the levels can have sublevels, such as a subgroup level 710. Each of the levels has a number of elements 712, as specified in the plan 408 (see FIG. 4). The model 700 is such that individual groups 704 are associated with certain payors 702. Further, individual memberships 706 are associated with certain groups 704 and individual people 708 are associated with certain memberships 706, for example, attributes of the plan 408 (see FIG. 4) that belong to group 2 also belong to the persons 2, 3, 4, 5, 6, etc. . . . under the global attribute assignment or hereby of the model 700. For further clarification, it is recognized that some attributes of the people level 708 would not be shared by other levels 702, 704, 706, due to the upper level to lower level inheritance scheme of the model 700. It is recognized that lower to higher and other structured global inheritance schemes other than described can be employed, if desired.

Figure 8:
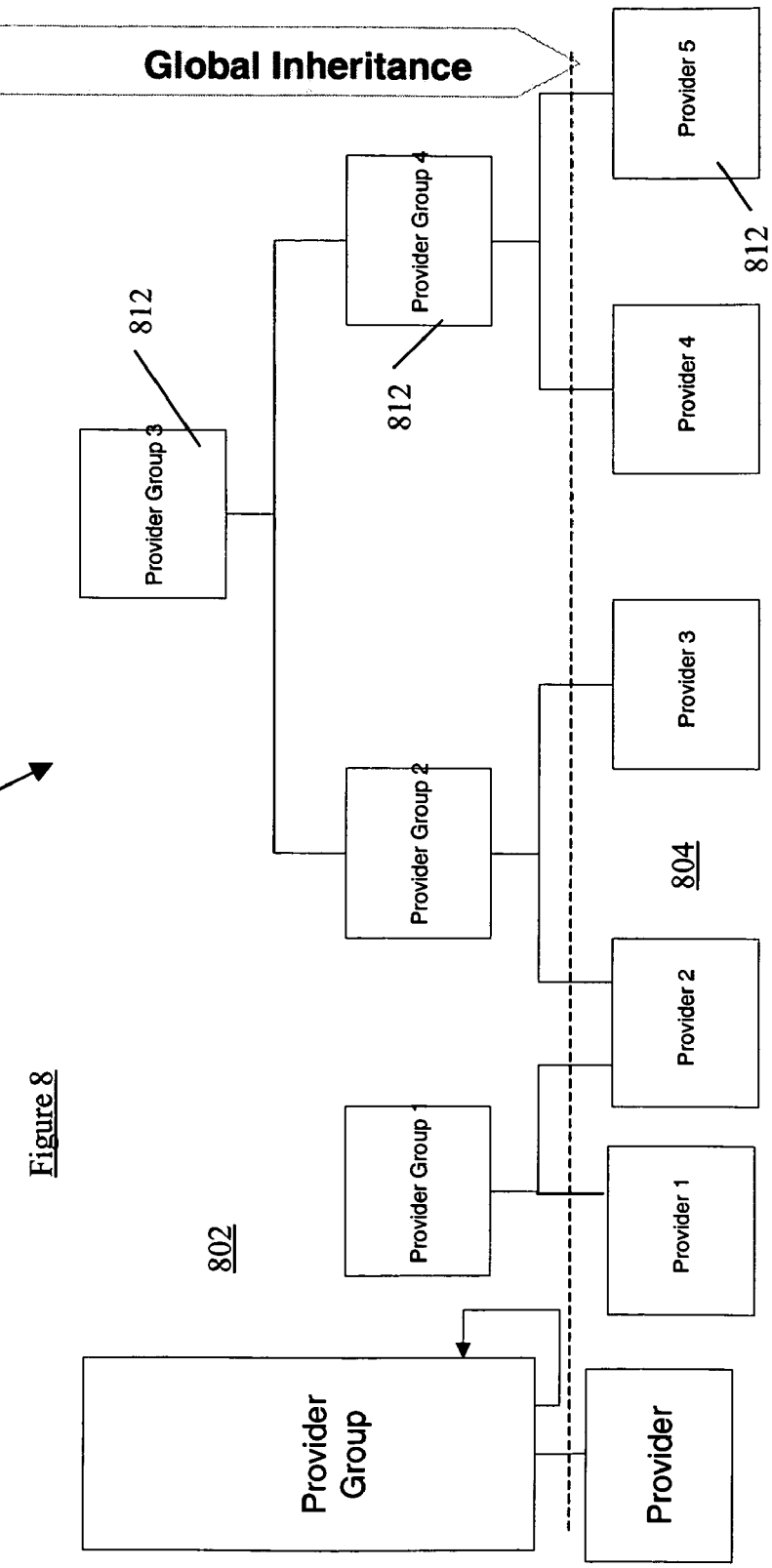
FIG. 8 is an example of a structured provider model of FIG. 1.

Referring to FIG. 8, it is recognized that the providers 14 of FIG. 1 could be represented as a structured provider model 800, such as a hierarchical tree. The model 800 has an implicit global inheritance, such that attributes associated with elements 812 of higher levels are automatically associated with the elements 812 of the lower levels, on a global basis. The model 800 can have such as but not limited to a provider group level 702 and a provider level 804. It is recognized that the levels can have sublevels. Each of the levels has a number of elements 812, as specified in the plan 408 (see FIG. 4). The model 800 is such that individual providers 804 are associated with certain-provider groups 802. For example, attributes of the plan 408 (see FIG. 4) that belong to provider group 2 also belong to the providers 1 and 2 under the global attribute assignment or hierarchy of the model 800. For further clarification, it is recognized that some attributes of the provider level 804 would not be shared by other levels 802, due to the upper level to lower level inheritance scheme of the model 800. It is recognized that lower to higher and other structured inheritance schemes other than described can be employed, if desired. Examples of Provider Groups 802 are such as but not limited to: Locations, PPOs, Chains, and Professional Associations. It is recognized that examples of the providers 804 can be dentists, doctors, drug stores, etc. . . .

Figure 9:
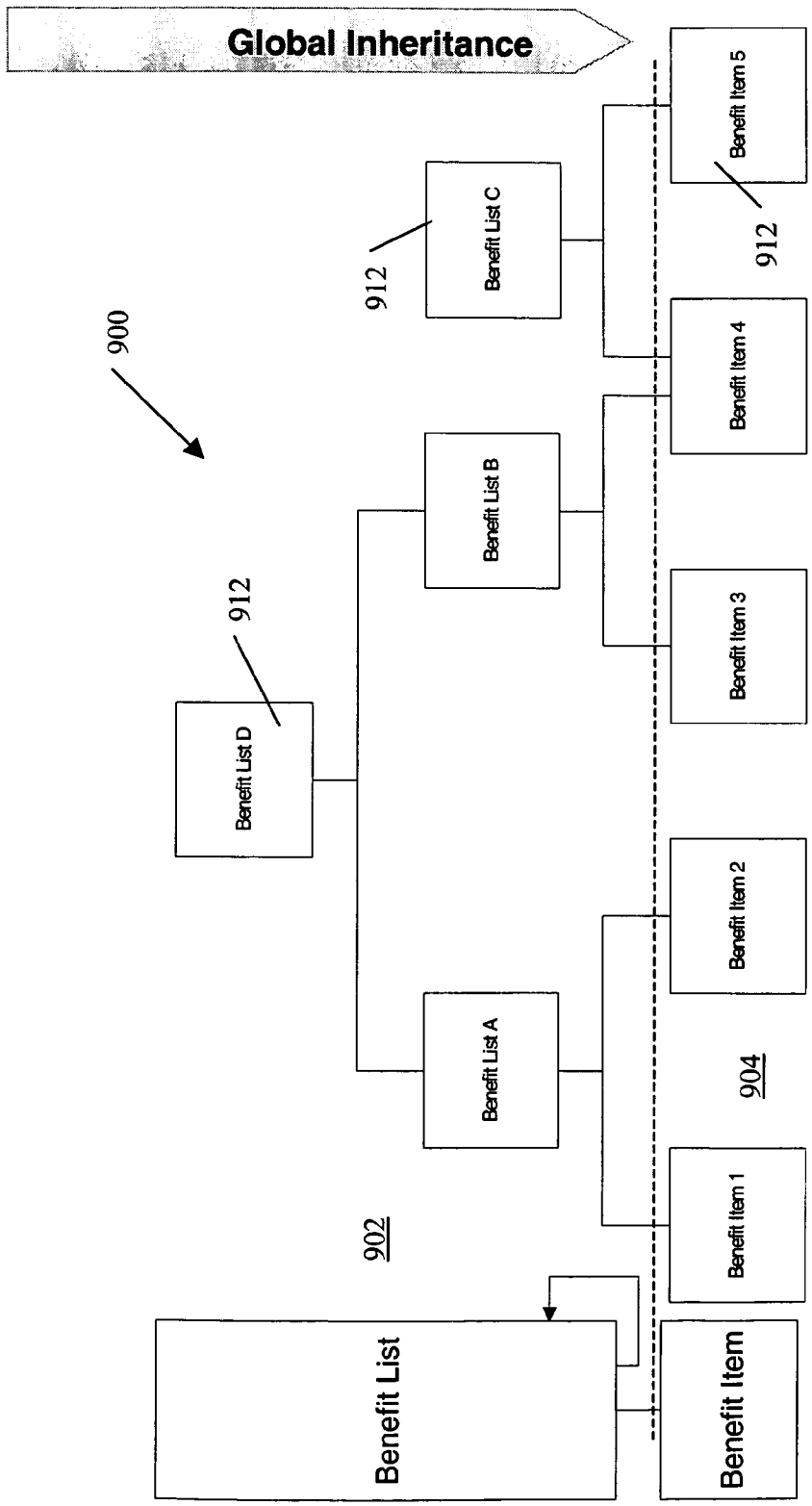
FIG. 9 is an example of a structured benefits model of FIG. 1.

Referring to FIG. 9, it is recognized that the benefits 400 of FIG. 4 could be represented as the structured benefits model 900, such as a hierarchical tree. The model 900 has an implicit global inheritance, such that attributes associated with elements 912 of higher levels are automatically associated with the elements 912 of the lower levels, on a global basis. The model 900 can have such as but not limited to a Benefit List level 902 and a Benefit Item level 904. It is recognized that the levels can have sublevels. Each of the levels has a number of elements 912, as specified in the plan 408 (see FIG. 4). The model 900 is such that individual benefit items 904 are associated with certain benefit lists 902. For example, attributes of the plan 408 (see FIG. 4) that belong to Benefit List A also belong to the Benefit Items 1 and 2 under the global attribute assignment or hierarchy of the model 900. For further clarification, it is recognized that some attributes of the level 904 would not be shared by other levels 902, due to the upper level to lower level inheritance scheme of the model 900. It is recognized that lower to higher and other structured inheritance schemes other than described can be employed, if desired.

As noted above with reference to FIGS. 1 to 9, the rules 506 represent units of logic that the adjudication engine 24 executes. The plan 408 is made up of people models 700 and benefit models 900 that contain global inheritance for attributes of the models 700, 900. It is recognized that the model 800 could also be included as part of the plan 408, as desired. The models 700, 800, 900 of the plan 408 are linked via policies 402 and agreements 404, populated as a global plan rule 401 to create a specific tailored plan 408, such as a company plan for dental involving company employees and dependents. The policies 402 of the plan rules 401 are a collection of the rules 506, and have modifiable parameters (terms & conditions 406) that can be set by the administrator. The agreements 404 can be part of the plan rules 401 and help to link parties (people 12/providers 14) to policies 402, their terms & conditions 406 and benefit lists 400 (where applicable). In the case where the plan 408 needs to be modified for certain local benefits 400, providers 14, and/or people 12 of the plan 408, additional local plan rules 401 can be attached between the models 700, 800, 900 to override selected global attributes. The addition of local plan rules 401 provides for a flexible insurance plan which is a combination of people 12 in a first model 700 combined with benefits 400 of a second model 900, whereby the combination of the models 700, 900 to create the plan is controlled by plan or administration rules 401, assigned both locally and globally. The models 700, 900 have inheritance of attributes associated with elements of the models 700, 900 in a predetermined manner. The interaction of the models 700, 900 and the administration rules 401 (local and global) helps to provide for the design of flexible insurance plans 408.

The administration rules 401 can comprise payment rules 506, enrolment rules 506, and submission rules 506, for example, whereby tailored inheritance in the form of overrides provided (by application of the local administration rules 401) can be enforced across the models 700, 900 of the plan 408. Further, the administration rules 401 also permit the override of global attributes assigned by the hierarchical nature of the models 700, 900. Accordingly, the flexible insurance plan system 409 (see FIG. 4) can change rules to customize plans 408 or to tailor administration of a selected element 712 within the people model 700 using only the first and second models 700, 900, rather than implementing separate tailored models 700, 900 for the selected element 712 (in addition to the two models 700, 900 used for the rest of the elements 712) with attached fixed rule sets 506, as is standard practice in the industry. Further, conflict resolution is provided by using priority setting of policies 402 within the administration rules 401 to affect the global order of execution specified in the policy model 500.

In general:

Overrides

Overrides are modifications to the parameters of the policy (ies) 402 that can be made by a Claim Examiner (not shown) using the a Payor Claim Submission System (such as the module 410) for a particular claim 20, subclaim 200 or the line 202. These overrides are considered by the Adjudication Engine 24 during the processing of the affected claim 20, subclaim 200 or line item 202. Potential example items that may be overridden include such as but not limited to rules 506 associated with: Benefit Eligibility Policies; People and Provider Eligibility Policies; Pricing Policies; and Fiscal Policies.

Rule Inheritance and Conflict Resolution

Rules 506 can be placed at various points along the product 900, people 700, or provider 800 hierarchies. Entities/elements lower in the hierarchy globally inherit rules 506 from entities/elements that are above them. Local administration rules 410 placed on entities lower in one hierarchy have more priority over global rules 410 and attributes above them in the same hierarchy, if the global and local rules conflict (i.e. override feature). In the case where the item appears in multiple engies, each hierarchy is assigned a priority through the policies 402 in order to facilitate conflict resolution.

Policy/Rule Execution Order

The order in which rules 506 of the plan 408 are to be processed by the engine 26 can be defined in such as but not limited to two ways:

1. Implicitly—The order may be globally inherent within the policy model 500 itself. If the condition of the rule 506 within the policy 402 is dependent on the results of another rule 506, then it is implied that the other rule 506 must execute first; and 2. Explicitly—Policies 402 can be assigned a local priority. This results in a type of flow between the policies 402 of the model 500.

Figure 10:
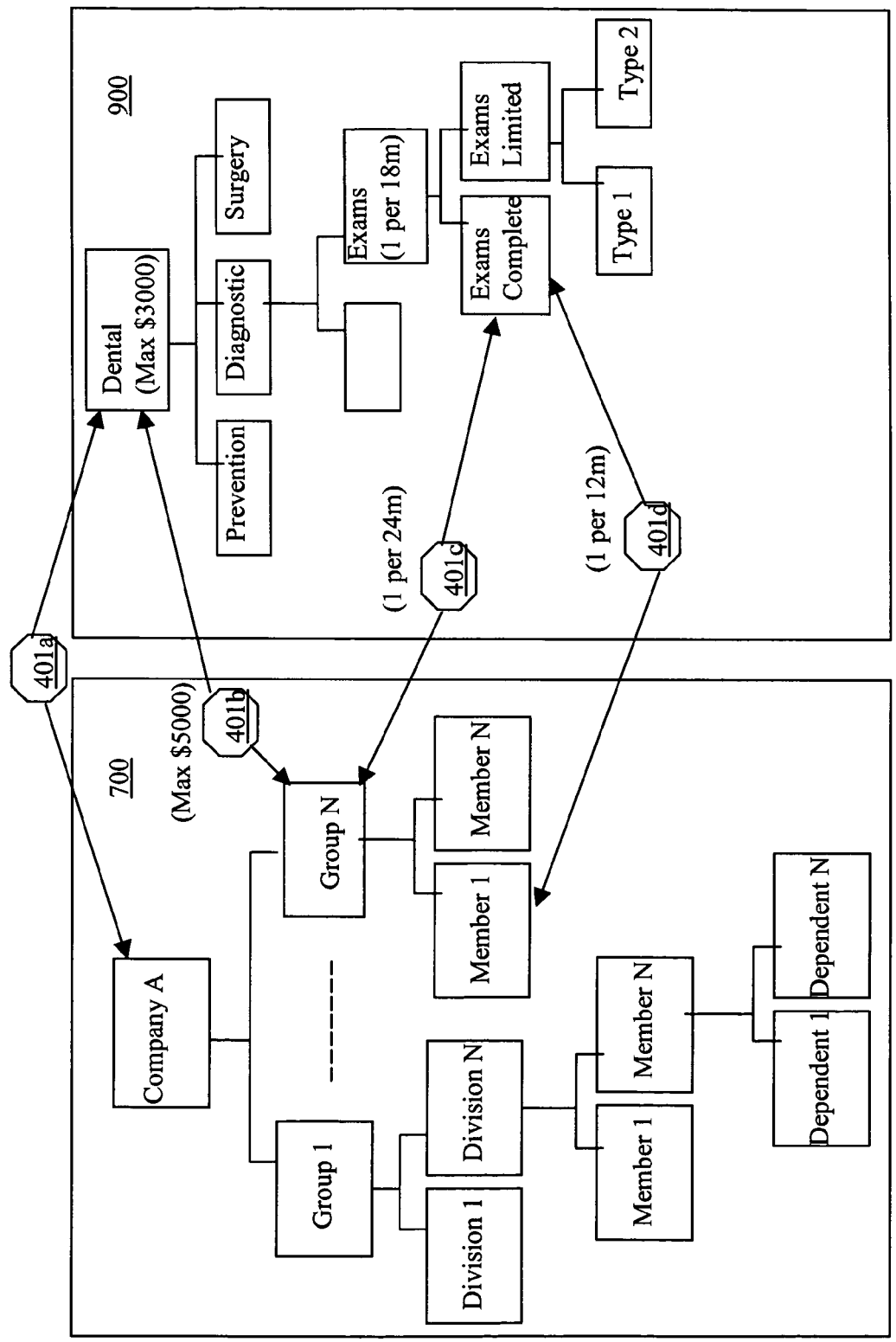
FIG. 10 is an example plan showing the linked models of FIGS. 7 and 9.

Referring to FIG. 10, an example of the people model 700 and the benefits model 900 is shown, such that the plan 408 (see FIG. 4) for Company A and Dental coverage is created by plan rule 401a. In this illustration, the people 700 of Group 1 (and all associated lower levels) for Company A get the dental model 900 having a maximum of $3000, with complete exams and limited exams on a frequency of one per 18 months. However, three additional plan rules 401b,c,d have been implemented between the models 700, 900 to override the global inheritance of the models 700, 900, in order to create the plan 408 tailored to certain individuals for specified attributes of the plan rules 401a,b,c, while leaving other attributes of the plan 408 to be assigned by the global inheritance of the models 700, 900. For example, plan rule 401b overrides the plan maximum and sets it to $5000 for Group N and Members 1 to N thereof. Plan rule 401c also sets the complete exam frequency at 1 per 24 months for Group N and all members thereto. However, it is noted that plan rule 401d sets Member N of Group N having complete exams at one per every 12 months. Hence, plan rule 401b overrode certain global inherence attributes of plan rule 401a, plan rule 401c overrode other global inherence attributes of plan rule 401a different from plan rule 401b, and plan rule 401d overrode the override attributes of plan rule 401c. Accordingly, member 1 of group N gets local attributes of the maximum of $5000 and the one complete exam every 12 months along with all other non-overridden global attributes assigned by the plan rule 401a. Member N of group N gets local attributes of the maximum of $5000 and the one complete exam every 24 months along with all other non-overridden global attributes assigned by the plan rule 401a. All other persons of the plan 408 for Group 1 remain unaffected by the local override attributes of plan rules 401b,c,d.

Example of Rule Resolution Between Products

Figure 11:
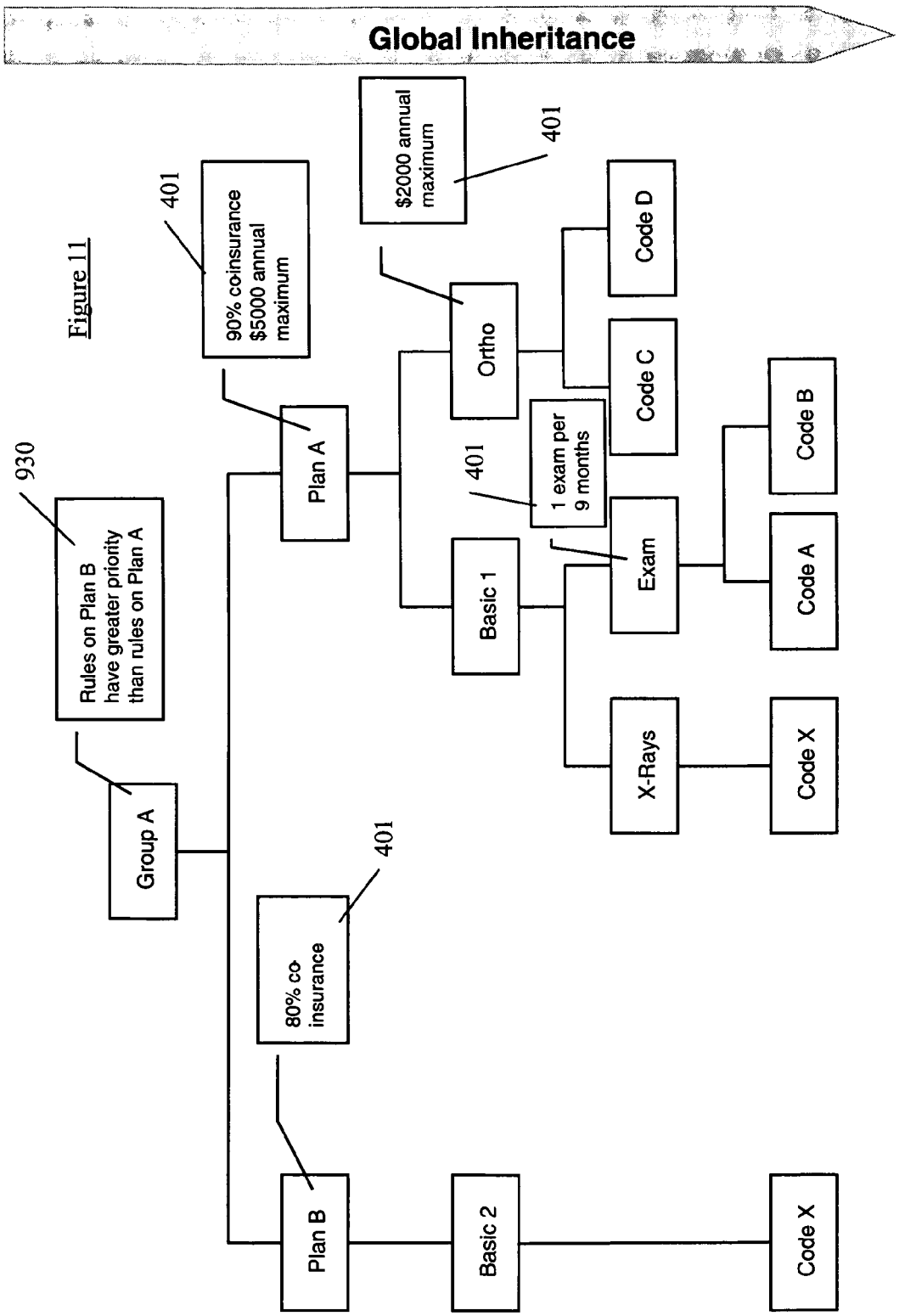
FIG. 11 is an example of rule resolution between products in the model of FIG. 9.

Referring to FIG. 11, the benefit model 900 has a series of local administration rules 401 attached and the policies 402 of the associated plans A,B have a priority setting 930 on them such that rules on plan B have greater priority than rules on plan A. This priority setting 930 in this case is a consequence of the attaching of the two local administration rules 401 having different co-insurance pages. Accordingly, code X would be in conflict (both 90% and 80%) if it was not for the priority setting 930. Accordingly, following the logic of the global inheritance and the locally imposed administration rule 401 inheritance and priority 930, the resulting conflict resolution is:

Code X of plan A and plan B both follow the 80% co-insurance;

Codes A & B are both subject to a frequency of 1 per 9 months with a—maximum of $5000; and Code C & D both have a maximum of $2000 with the 80% co-insurance.

Example of Rule Resolution Between People

Figure 12:
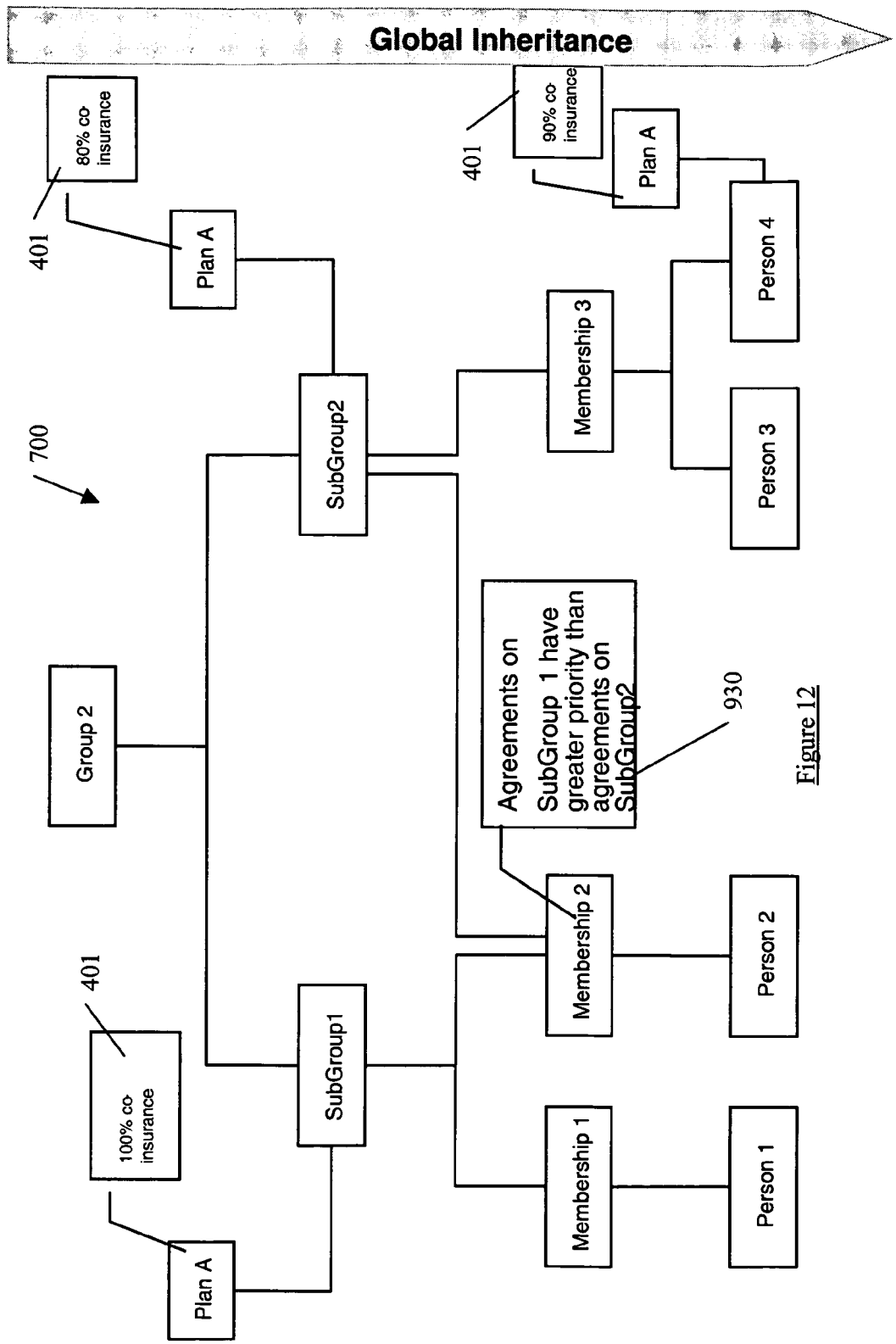
FIG. 12 is an. example of rule resolution between people in the model of FIG. 7.

Referring to FIG. 12, the people model 700 has a series of local partion rules 401 attached and the policies 402 of the associated Subgroups have greater priority setting 930 on them such that policies 402 on Subgroup 1 have greater priority than policies 402 on Subgroup 2. This priority setting 930 in this area is a consequence of the attaching of the two local administration rules 401 having different co-insurance percentages. Accordingly, person 2 would be in conflict (100% and 80%) if it was not for the priority setting 930. Accordingly, following the logic of the global inheritance and the locally imposed administration rule 401 inheritance and priority 930, the resulting conflict resolution is:

Person 1 and Person 2 follow the 100% co-insurance;

Person 3 follows the 80% co-insurance; and

Person 4 follows the 90% co-insurance.

It will be appreciated that variations of some elements are possible to adapt the invention for specific conditions or functions. The concepts of the present invention can be further extended to a variety of other applications that are clearly within the scope of this invention. Having thus described the present invention with respect to preferred embodiments as implemented, it will be apparent to those skilled in the art that many modifications and enhancements are possible to the present invention without departing from the basic concepts as described in the preferred embodiment of the present invention. Therefore; what is intended to be protected by way of letters patent should be limited only by the scope of the following claims.

What is claimed is:

1. A method for implementing an insurance plan for a group of people with rules to coordinate an adjudication of a submitted claim corresponding to the plan, the plan including a people model and a benefit model linked by a plurality of policies, the method comprising the steps of:

assigning a first predefined inheritance of global attributes pertaining to people between at least two coupled people elements representing people within the people model, wherein the people model having the at least two coupled people elements is a people hierarchal tree representing the group of people under the insurance plan, and wherein the people hierarchal tree has a payor level, a group level, a member level and an individual level;

assigning a second predefined inheritance of global attributes pertaining to benefits between at least two coupled benefit elements representing rules within the benefit model, wherein the benefit model having the at least two coupled benefit elements is a benefit hierarchal tree representing benefits under the insurance plan;

interconnecting a selected people element of the people model and a selected benefit element of the benefit model by assigning a local rule for at least one local attribute for administering the insurance plan;

resolving conflicts in administering the insurance plan, by a computer processor, through overrides, wherein overrides comprise applying the local rule based upon determining that one of the global attributes conflicts with the local rule; and wherein overriding of the global attributes with the local attributes for the selected elements provides a customized rule set for adjudication of the submitted claim.

2. The method of claim 1 further comprising the step of assigning a plurality of the local rules to corresponding multiple selected elements.

3. The method of claim 2 further comprising the step of globally inheriting the local rules for all elements coupled to the selected elements according to an inheritance direction of the predefined global inheritance of the people model and the benefit model.

4. The method of claim 3, wherein the local rules are selected from the group comprising payment rules, enrolment rules, and submission rules.

5. The method of claim 2, wherein the attributes are rules from the policies selected from the group comprising group benefit eligibility, people and provider eligibility, pricing, and fiscal.

6. The method of claim 5, wherein the attributes further include terms and conditions of the rules.

7. The method of claim 1 further comprising the step of combining a provider model in the plan.

8. The method of claim 7, wherein the provider model includes provider groups and individual providers.

9. The method of claim 8, wherein the provider groups are selected from the group comprising location specific, PPOs, chains, and professional associations.

10. The method of claim 1 further including the step of combining a policy model containing a plurality of the policies, the model for assigning a predefined global priority to each of the policies in the policy model.

11. The method of claim 10, wherein the policies of the policy model are selected from the group comprising fiscal, benefit, and pricing.

12. The method of claim 11, wherein the policy model is a tree structure.

13. The method of claim 12, wherein the predefined global priority of the policy tree has two priority directions, one direction between levels of the tree and the other direction along each of the levels of the tree.

14. The method of claim 10, wherein each of the policies includes a series of rules for implementing the policy in the plan.

15. The method of claim 14 further comprising the step of setting a local priority for a selected one of the policies of the policy model, the local priority for overriding the global execution order of the selected policy as predefined by the policy model.

16. The method of claim 15 further comprising the step of resolving a conflict between the attributes of at least one of the people model and the benefit model through the local priority.

17. The method of claim 16 further comprising the step of setting a plurality of the local priorities corresponding to multiple selected policies.

18. The method of claim 1 wherein the at least two coupled people elements can be any one of a company, a group within the company, a division within the group or the company, a member of any one of the group and division, and a dependent of the member.

19. A system for implementing an insurance plan for a group of people to coordinate an adjudication of a submitted claim corresponding to the plan, the plan including a people model and a benefit model linked by a plurality of policies, the system comprising:

a memory for storing the people model having a first predefined inheritance of global attributes pertaining to people between at least two coupled people elements representing people within the people model, wherein the people model having the at least two coupled people elements is a people hierarchal tree representing the group of people under the insurance plan, and wherein the people hierarchal tree has a payor level, a group level, a member level and an individual level;

the memory for further storing the benefit model having a second predefined inheritance of global attributes pertaining to benefits between at least two coupled benefit elements representing rules within the benefit model, wherein the benefit model having the at least two coupled benefit elements is a benefit hierarchal tree representing benefits under the insurance plan;

a computer processor coupled to the memory, the processor configured to interconnect a selected people element of the people model and a selected benefit element of the benefit model by assigning a local rule for at least one local attribute for administering the insurance plan, the processor further configured to resolve conflicts in administering the insurance plan through overrides, wherein overrides comprise applying the local rule based upon determining that one of the global attributes conflicts with the local rule; and wherein overriding of the global attributes with the local attributes for the selected elements provides a customized rule set for adjudication of the submitted claim.

20. The system of claim 19 further comprising a plurality of the local administration rules to corresponding multiple selected elements.

21. The system of claim 20, wherein the local rules are globally inherited for all elements coupled to the selected elements according to an inheritance direction of the predefined global inheritance of the people model and the benefit model.

22. The system of claim 21, wherein the local rules are selected from the group comprising payment rules, enrolment rules, and submission rules.

23. The system of claim 20, wherein the attributes are rules from the policies selected from the group comprising group benefit eligibility, people and provider eligibility, pricing, and fiscal.

24. The system of claim 23, wherein the attributes further include terms and conditions of the rules.

25. The system of claim 19 further comprising a provider model combined in the plan.

26. The system of claim 25, wherein the provider model includes provider groups and individual providers.

27. The system of claim 26, wherein the provider groups are selected from the group comprising location specific, PPOs, chains, and professional associations.

28. The system of claim 19 comprising a policy model included in the plan and containing a plurality of the policies, the policy model for assigning a predefined global priority to each of the policies in the policy model.

29. The system of claim 28, wherein the policies of the policy model are selected from the group comprising fiscal, benefit, and pricing.

30. The system of claim 29, wherein the policy model is a tree structure.

31. The system of claim 30, wherein the predefined global priority of the policy tree has two priority directions, one direction between levels of the tree and the other direction along each of the levels of the tree.

32. The system of claim 28, wherein each of the policies includes a series of rules for implementing the policy in the plan.

33. The system of claim 32 further comprising a local priority set for a selected one of the policies of the policy model, the local priority for overriding the global execution order of the selected policy as predefined by the policy model.

34. The system of claim 33, wherein the local priority resolves a conflict between the attributes of at least one element of the people model and the benefit model.

35. The system of claim 34 further comprising a plurality of the local priorities corresponding to multiple selected policies.

36. The system of claim 19 wherein the at least two coupled people elements can be any one of a company, a group within the company, a division within the group or the company, a member of any one of the group and division, and a dependent of the member.

37. A computer readable medium for implementing an insurance plan for a group of people to coordinate an adjudication of a submitted claim corresponding to the plan, the plan including a people model and a benefit model linked by a plurality of policies, the computer readable medium comprising:

a people model module stored on the computer readable medium having a first predefined inheritance of global attributes pertaining to people between at least two coupled people elements representing people within the people model, wherein the people model having the at least two coupled people elements is a people hierarchal tree representing the group of people under the insurance plan, and wherein the people hierarchal tree has a payor level, a group level, a member level and an individual level;

a benefit model module stored on the computer readable medium having a second predefined inheritance of global attributes pertaining to benefits between at least two coupled benefit elements representing rules within the benefit model, wherein the benefit model having the at least two coupled benefit elements is a benefit hierarchal tree representing benefits under the insurance plan;

a local rule module stored on the computer readable medium for interconnecting a selected people element of the people model and a selected benefit element of the benefit model by assigning a local rule for at least one local attribute for administering the insurance plan by a computer processor coupled to the computer readable medium by resolving conflicts in administering the insurance plan, by a computer processor, through overrides, wherein overrides comprise applying the local rule based upon determining that one of the global attributes conflicts with the local rule; and wherein overriding of the global attributes with the local attributes for the selected elements provides a customized rule set for adjudication of the submitted claim.

\* \* \* \* \*